United States Patent
Mueller et al.

[11] Patent Number: 6,156,186
[45] Date of Patent: *Dec. 5, 2000

[54] METHOD FOR REMOVING CONTAMINANTS FROM PROCESS STREAMS IN METAL RECOVERY PROCESSES

[75] Inventors: Jeff Mueller, Boulder; Dennis H. Green, Arvada, both of Colo.

[73] Assignee: HW Process Technologies, Inc., Lakewood, Colo.

[*] Notice: This patent is subject to a terminal disclaimer.

[21] Appl. No.: 09/183,683

[22] Filed: Oct. 30, 1998

Related U.S. Application Data

[60] Provisional application No. 60/100,510, Sep. 16, 1998, provisional application No. 60/100,494, Sep. 16, 1998, provisional application No. 60/077,878, Mar. 13, 1998, provisional application No. 60/077,428, Mar. 9, 1998, provisional application No. 60/064,284, Oct. 30, 1997, provisional application No. 60/064,279, Oct. 30, 1997, provisional application No. 60/099,717, Sep. 10, 1998, and provisional application No. 60/100,497, Sep. 16, 1998.

[51] Int. Cl.[7] ............... C25C 1/00; C25C 1/16; C25C 1/20; C15G 1/12; B01D 11/00

[52] U.S. Cl. ............ 205/560; 205/568; 205/569; 205/570; 205/571; 205/581; 205/582; 205/605; 205/606; 210/650

[58] Field of Search ................ 205/560, 568, 205/571, 580, 589, 594, 569, 570, 581, 582, 590, 591, 605, 606; 210/650

[56] References Cited

U.S. PATENT DOCUMENTS

| | | | |
|---|---|---|---|
| 3,697,400 | 10/1972 | Pang | 204/106 |
| 3,816,587 | 6/1974 | Gosser | 423/29 |

(List continued on next page.)

FOREIGN PATENT DOCUMENTS

WO 94/27711 12/1994 WIPO .

OTHER PUBLICATIONS

Hernandez, "Membrane Plant for Preconcentration of Copper PLS and Removal of Excess Leach Water", *Arizona Conference of AIME Hydrometallurgical Division*, 1997, pp. 1–30, (No Month).

The Nalco Water Handbook, Chapter 15, "Membrane Separation", pp. 16.1–16.4, (No Date).

Product Summary Sheet "Reverse Osmosis Elements" *Desalination Systems, Inc. of Escondido, CA*, Apr. 1991, 2 pages.

Application Bulletin "Desal–5 107" *Desalination Systems, Inc. of Escondido, CA*, Apr. 1991, 2 pages.

Eriksson et al., "Nanofiltration for Removal of Surplus Water in Dump Leaching", *Tailings and Mine Waste '96* Conference, Colorado State University Ft. Collins, Jan. 16–19, 1996, pp. 1–7.

Raman et al., "Consider Nanofiltration for Membrane Separations", *Chemical Engineering Progress*, Mar. 1994, pp. 68–74.

"Pilot Plant Studies on the Relationship between Copper Solvent Extraction Reagents and Crud Formation"; *Society for Mining, Metallurgy, and Exploration, Inc.*; Preprint No. 96–35; Mar. 11–14, 1996; pps. 1–5.

"Cross Contaminationof ODC Solvent Extraction Circuits"; *Society for Mining, Metallurgy, and Exploration, Inc.*; Preprint No. 96–162; Mar. 11–14, 1996; pps. 1–10.

(List continued on next page.)

*Primary Examiner*—Donald R. Valentine
*Attorney, Agent, or Firm*—Sheridan Ross P.C.

[57] ABSTRACT

The present invention is directed to a process for removing various contaminants (e.g., organic collectors, contaminant metals or spectator ions, and/or suspended and colloidal solids) from process streams in leaching processes. The contaminant removal is performed by one or more membrane filtration systems (e.g., nanofilters, ultrafilters, and/or microfilters) treating process streams including, the pregnant leaching solution, the barren raffinate, and the lean and rich electrolytes.

33 Claims, 7 Drawing Sheets

U.S. PATENT DOCUMENTS

| | | | |
|---|---|---|---|
| 3,929,468 | 12/1975 | Siemens et al. | 75/103 |
| 4,016,056 | 4/1977 | Demarthe et al. | 204/108 |
| 4,083,758 | 4/1978 | Hamby et al. | 204/106 |
| 4,269,676 | 5/1981 | Libus et al. | 204/107 |
| 4,594,132 | 6/1986 | Satchell, Jr. et al. | 204/105 |
| 4,752,363 | 6/1988 | Buckley et al. | 204/94 |
| 4,880,511 | 11/1989 | Sugita | 204/151 |
| 4,944,882 | 7/1990 | Ray et al. | 210/640 |
| 4,981,594 | 1/1991 | Jones | 210/634 |
| 4,992,179 | 2/1991 | Brierley et al. | 210/661 |
| 5,028,336 | 7/1991 | Bartels et al. | 210/639 |
| 5,039,416 | 8/1991 | Loew et al. | 210/631 |
| 5,041,227 | 8/1991 | Van Eikeres et al. | 210/648 |
| 5,112,483 | 5/1992 | Cluff | 210/259 |
| 5,114,576 | 5/1992 | Ditzler et al. | 210/195.1 |
| 5,116,511 | 5/1992 | Green et al. | 210/673 |
| 5,158,683 | 10/1992 | Lin | 210/651 |
| 5,266,203 | 11/1993 | Mukhopadhyay et al. | 210/638 |
| 5,279,745 | 1/1994 | Jeffers et al. | 210/688 |
| 5,310,486 | 5/1994 | Green et al. | 210/638 |
| 5,403,490 | 4/1995 | Desai | 210/652 |
| 5,411,575 | 5/1995 | Fleming et al. | 75/743 |
| 5,476,591 | 12/1995 | Green | 210/638 |
| 5,670,033 | 9/1997 | Burgess et al. | 205/74 |
| 5,670,035 | 9/1997 | Virnig et al. | 205/345 |
| 5,733,431 | 3/1998 | Green et al. | 205/581 |
| 5,766,478 | 6/1998 | Smith et al. | 210/638 |
| 5,779,877 | 7/1998 | Drinkard, Jr. et al. | 205/560 |
| 5,935,409 | 8/1999 | King et al. | 205/560 |

OTHER PUBLICATIONS

Lynch, et al.; "Solvent Extraction Boom in Latin America"; Dec. 1994; pps. 18–21.

Townson, et al.; "The Solvent Extraction of Copper—a Perspective"; 7 pages, No Date.

"SX–EW Solvent Extraction–Electrowinning"; Magma; 5 pages, No Date.

(5) FILTRATION OF LEAN ELECTROLYTE TO REMOVE ALL METALS, INCLUDING VALUABLE METAL

METHOD FOR REMOVING CONTAMINANTS FROM PROCESS STREAMS IN METAL RECOVERY PROCESSES

RELATED APPLICATIONS

The present application claims the benefit of the following U.S. provisional applications under 35 U.S.C. Section 119: Ser. No. 60/100,510 filed Sep. 16, 1998; Ser. No. 60/100,497 filed Sep. 16, 1998; Ser. No. 60/100,494 filed Sep. 16, 1998; Ser. No. 60/077,878 filed Mar. 13, 1998; Ser. No. 60/077,428 filed Mar. 9, 1998; Ser. No. 60/064,284 filed Oct. 30, 1997; Ser. No. 60/064,279 filed Oct. 30, 1997; and Ser. No. 60/099,717 filed Sep. 10, 1998, each of which is incorporated herein by this reference.

FIELD OF THE INVENTION

The present invention relates generally to processes for recovering copper from copper-containing materials and specifically to processes for removing various contaminants from process streams in solvent extraction/electrowinning plants.

BACKGROUND

Hydrometallurgical copper mining operations commonly use a leaching system and a copper extraction plant, particularly a solvent extraction/electrowinning (SX/EW) plant, to recover copper. Currently, electrowon copper accounts for about 30% of total U.S. copper production. Worldwide, there are more than 26 major heap, dump, or in-situ leaching operations using SX/EW, with a total capacity of 800,000 tons of copper annually. Copper mining operations using leaching and SX/EW are able to process low-grade ores profitably due to low labor, capital, and operating costs.

In copper leaching, a lixiviant, typically aqueous sulfuric acid, is contacted with rock or ore containing the copper to solubilize the copper in the lixiviant and form a pregnant leach solution containing dissolved copper. The contact of the lixiviant and rock can be performed in a tank or other vessel (known as agitation or vat leaching) or on an impervious leach pad upon which the rock is formed into a pile or heap (known as heap leaching).

The steps required to extract the dissolved copper from the pregnant leach solution depend upon the selected recovery method. In an SX/EW plant, the pregnant leach solution is contacted with an organic collector, such as hydroxy phenyl oximes, typically at a pH ranging from about pH1 to about pH3 in a liquid, commonly referred to as the "lix," to cause the dissolved copper to attach to the organic collector to form a loaded organic, and the loaded organic collector is later contacted with an electrolyte or stripping solution of about 100–200 g acid/L to resolubilize the copper in a rich stripping solution. The barren raffinate is recycled to the leaching step, and the barren lix to the step of copper extraction from the pregnant leach solution. In an IX/EW plant, the pregnant leach solution is contacted with an ion exchange resin, typically at a pH ranging from about pH1 to about pH3, and the copper ions are transferred to the ion exchange resin. The copper-rich ion exchange resin is then contacted with the stripping solution of about 100–200 g acid/L to transfer the copper from the ion exchange resin to the stripping solution or electrolyte. In either case, the copper-rich electrolyte or stripping solution is introduced into an electrowinning cell where copper is recovered on an electrode and the barren electrolyte is subsequently recontacted with the copper-loaded organic solution.

Contaminants in the various process streams in the above-described process can reduce copper recovery. By way of example, organic collector that is carried over into the copper-rich or copper barren electrolyte streams (i.e., in the electrowinning circuit) and/or multi-valent metals can foul/contaminate the copper cathode in the electrowinning cell, reduce current efficiency and copper product quality, and cause poor copper removal from the cathode blank. Bleed streams have been used in the past to control the build-up of such contaminants. Bleed streams, however, require the replacement of large quantities of acid and clean water (which is costly) and remove a substantial amount of copper (and expensive cobalt additive) from the electrolyte circuit. Excess multivalent copper ions in the stripping circuit can also create problems because the driving force for solubilizing the copper attached to the organic collector or ion exchange resin is dependent directly on the copper concentration in the barren electrolyte. Suspended and colloidal solids can further detrimentally impact the phase separation of the rich electrolyte from the barren lix due to the formation of "crud" (an emulsion of organic collector, pregnant leach solution, and suspended and colloidal solids), and they can also plug ion exchange resin beds. As used herein, "suspended solids" refer to solids having a size above about 0.45 microns, and "colloidal solids" refer to solids having a size below about 0.45 microns. Accordingly, reducing the copper and colloidal solid concentrations in the barren electrolyte can significantly increase the amount of copper concentrated in the rich electrolyte after the stripping step. The build-up of multi-valent metals such as silica, aluminum, zinc, cadmium, iron, manganese, calcium, and magnesium, and metalloids/semi-metals, such as arsenic and selenium, in the leaching circuit can detrimentally affect the solubility of copper in the lixiviant and thereby decrease copper recovery. Organic collector in the leaching circuit can also represent a large economic loss and create numerous environmental problems as it "coats" or contaminates the ore heap.

SUMMARY OF THE INVENTION

Objectives of the present invention include removing various contaminants, such as spectator ions, organic collector, suspended and colloidal solids, and other contaminants from the electrowinning and/or leaching circuits to improve copper recovery and system efficiencies and reduce operating costs.

These and other objectives are addressed by the process of the present invention. The process includes the steps of:

(a) contacting a lixiviant with a valuable metal-containing material to form a pregnant leach solution in which at least a portion of the valuable metal in the valuable metal-containing material is dissolved;

(b) contacting the pregnant leach solution with a collector, preferably an organic compound or an ion exchange resin, to form a loaded collector including at least most of the valuable metal in the pregnant leach solution and a stripped raffinate solution;

(c) contacting the loaded collector with a stripping solution to form a stripped collector and a rich stripping solution including at least most of the valuable metal in the loaded collector and a contaminant;

(d) filtering at least a portion of at least one of the pregnant leach solution, the rich stripping solution, a barren stripping solution derived from the rich stripping solution, and the stripped raffinate solution to form a retentate containing the contaminant and a permeate; and (e) recovering at least a portion of the valuable metal in the rich stripping solution by a suitable technique (e.g., electrowinning, cementation, etc.) to form the barren stripping solution and a metal product.

The valuable metal recovered by this process can be any suitable metal, with copper, gold, silver, zinc, cobalt, uranium, nickel, and mixtures thereof being preferred. The process is particularly useful for recovery of copper from copper ore.

The lixiviant includes a leaching agent that facilitates the solubilization of the valuable metal in the lixiviant. The leaching agent is commonly a chemical agent that is preferably selected from the group consisting of sulfuric acid, nitric acid, hydrochloric acid, a chloride, a nitrate, ammonia, ammonium salts, a sulfate, a cyanide, a thiocyanate, a hydroxide, carbon dioxide, oxygen, and mixtures thereof. More preferably, the lixiviant is acidic and includes an acid, such as sulfuric acid, nitric acid, hydrochloric acid, and mixtures thereof.

The collector is preferably a suitable organic compound or an ion exchange resin. Preferred organic compounds include hydroxy phenyl oximes, alamines, and mixtures thereof. The collector is more preferably selected from the group consisting of the resins sold under the trade names "LIX 54", "LIX 63", "LIX 64", "LIX 65", "LIX 85", "LIX 622N" and "LIX 860" as manufactured by HENKEL; "PT5050", "M5640", "M56115" and "P-5100" as manufactured by ACORGA LTD.; and "ALAMINE 336" (uranium extraction), and mixtures thereof. Preferred ion exchange resins include weak and strong cation exchange resins, and mixtures thereof.

The stripping or electrolyte solution can be any solution that is capable of removing the valuable metal from the collector and, in electrowinning applications, facilitates the electrode deposition of the valuable metal on a cathode. Preferably, the electrolyte solution includes sulfuric acid (copper), sodium hydroxide (uranium), or others.

The contaminant can be any undesirable substance in the process stream being filtered. The contaminant is typically one or more of (a) a multivalent ion, such as zinc, cadmium, iron, manganese, aluminum, calcium, and magnesium, and/or metalloids/semi-metals, such as arsenic, selenium, silica and mixtures thereof, and may include unrecovered valuable metal ions such as copper, nickel, and cobalt; (b) an organic collector such as hydroxy phenyl oximes, alamines, and mixtures thereof, and/or (c) suspended and/or colloidal solids.

The filtering step can be performed by a suitable filter, depending upon the type of contaminant being removed. A preferred filter for removing multivalent ions (and organic collector and suspended and colloidal solids but not the leaching agent) has a pore size ranging from about 5 angstroms (or about 0.0005 microns) to about 500 angstroms (or about 0.05 microns) and more preferably from about 10 angstroms (or about 0.001 microns) to about 100 angstroms (or about 0.01 microns). As will be appreciated, such filters will also remove organic collectors and suspended and colloidal solids. Particularly preferred filters for removing multi-valent ions include nanofilters and ultrafilters, with nanofilters being most preferred. A preferred filter for removing both entrained organic collector and suspended and colloidal solids (but not multi-valent ions and leaching agent) has a pore size ranging from about 30 angstroms (or about 0.003 microns) to about 10,000 angstroms (or about 1 micron) and more preferably ranging from about 50 angstroms (or about 0.005 microns) to about 1,000 angstroms (or about 0.1 microns). Preferred filters include microfilters and ultrafilters. A preferred filter for removing suspended and colloidal solids from the pregnant leach solution (but not the valuable metal and leaching agent) has a pore size ranging from about 30 to about 10,000 angstroms (or from about 0.003 to about 1 microns) and more preferably from about 50 to about 1,000 angstroms (or from about 0.005 to about 0.1 microns). Preferred filters for this application include microfilters and ultrafilters. Filtration is discussed in detail in U.S. Pat. Nos. 5,116,511; 5,310,486; and 5,476,591, which are incorporated herein by this reference fully in their entireties.

The stream that is filtered can be any of the process streams in the leaching, collecting, or electrowinning circuits. Preferably, the filtering is performed on the pregnant leach solution, the barren raffinate, the rich electrolyte, or the barren electrolyte streams.

Rather than filtering the entire volume of the stream, only a bleed stream of the stream can be filtered to reduce the capacity of the filtration system and therefore the filtration system's capital and operating costs. Typically, the bleed stream will constitute from about 0.01 to about 10 and more typically from about 0.1 to about 5% by volume of the stream from which the bleed stream is removed.

The filtration is conducted such that at least most of the contaminate in the stream to be filtered is in the retentate and at least most of the stream's volume is in the permeate. Preferably, at least about 50% and more preferably at least about 75% of the contaminant is in the retentate. Preferably, at least about 30% of the stream's volume (prior to filtration) and more preferably at least about 50% of the stream's volume is in the permeate. The retentate preferably has a higher concentration of the contaminant than the stream that is filtered and the permeate. More preferably, the retentate includes at least about 105% of the contaminate level in the stream prior to filtration. The permeate preferably has at least about 5% less contaminate concentration than the stream prior to filtration.

Figure 1:
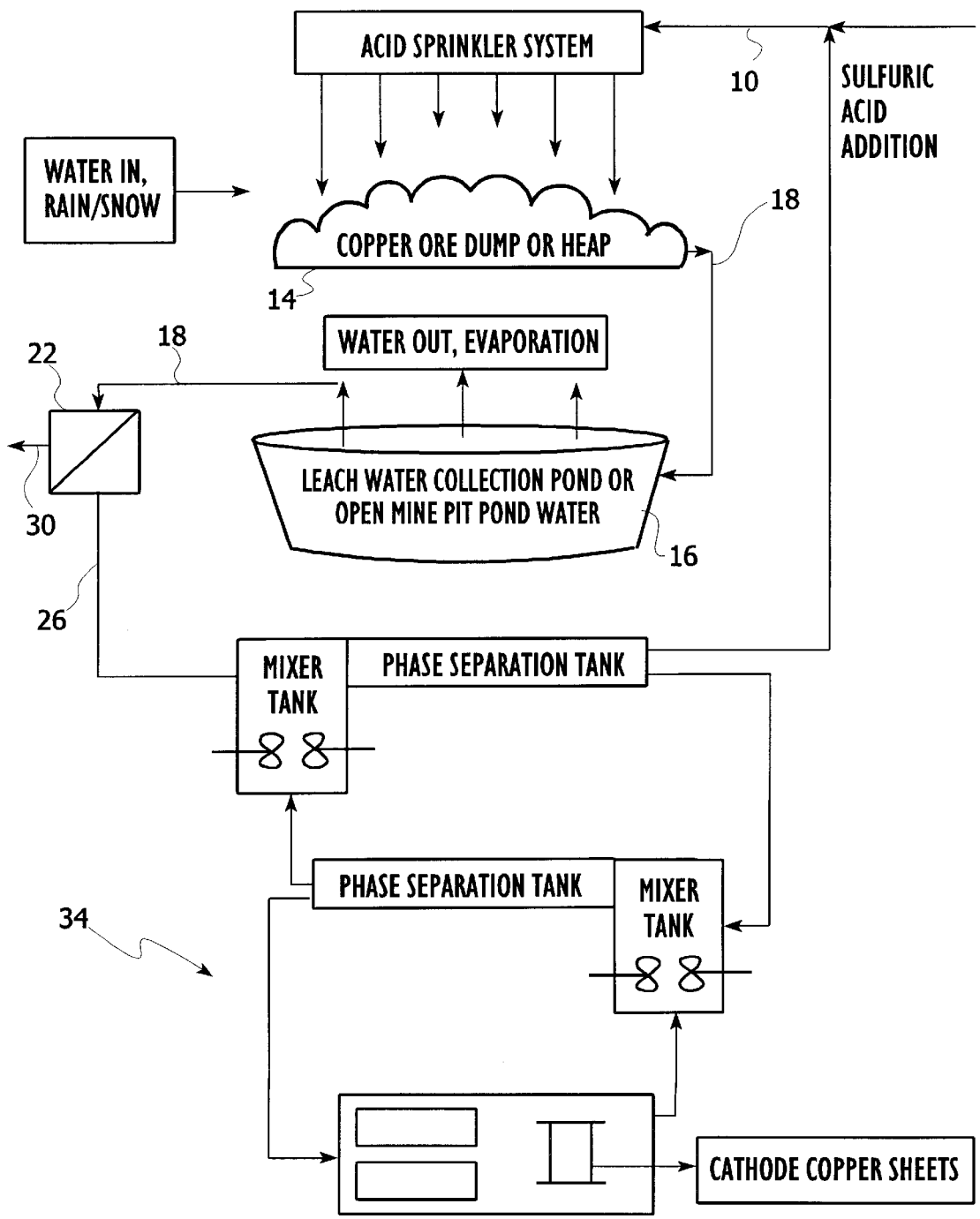
FIG. 1 is a flow schematic depicting a process according to a first embodiment of the present invention.

DETAILED DESCRIPTION
Filtration of the Pregnant Leach Solution

In the first process embodiment of the present invention, the pregnant leach solution is subjected to filtration prior to the recovery of the valuable metal to provide increased valuable metal recovery and reduced operating costs. The typical contaminants removed by the process include suspended and colloidal solids.

The suspended and colloidal solids are relatively finely sized and therefore capable of being entrained in the pregnant leach solution. Commonly, the suspended solids have a size of no more than about 100 micron and typically ranging from about 0.45 to about 100 microns, and the colloidal solids a size of no more than about 0.45 microns and typically ranging from about 0.005 to about 0.45 microns.

Filtration can be performed using a variety of microfiltration or ultrafiltration membranes. Preferably, the filter has a pore size ranging from about 0.003 microns to about 0.1 micron and more preferably from about 0.01 to about 0.05 microns.

Filtration is conducted such that most of the pregnant leach solution is contained in the permeate. The retentate preferably comprises no more than about 20% by volume of the pregnant leach solution and more preferably no more than about 5% by volume of the pregnant leach solution because the valuable metal passed by the filter will be distributed in volumetric proportion between the retentate and permeate. In contrast, the permeate preferably comprises at least about 80% by volume of the pregnant leach solution and more preferably at least about 95% by volume of the pregnant leach solution. In this manner, at least about 80% of the valuable metal in the pregnant leach solution is preferably contained in the permeate and no more than about 20% of the metal in the pregnant leach solution is preferably contained in the retentate.

Filtration removes substantially all of the suspended solids and colloidal solids from the permeate and places them in the retentate. Preferably, the permeate is substantially free of suspended and colloidal solids and more preferably comprises no more than about 1% of the suspended and colloidal solids in the pregnant leach solution. In contrast, the retentate preferably comprises at least about 95% and more preferably at least about 99% of the suspended and colloidal solids in the pregnant leach solution.

The retentate can be recycled to step (a) for further leaching of the metal-containing material.

This method specifically provides an improved method for metal recovery in which the suspended and colloidal solids are removed from the pregnant leach solution, leaving a cleaner pregnant leach solution for valuable metal extraction with organic collectors or ion exchange resin beds. Removal of suspended and colloidal solids from the pregnant leach solution increases the metal loading efficiency onto both the organic collector and ion exchange resin. Additionally, removal of suspended and colloidal solids from the pregnant leach solution increases the valuable metal/iron loading selectivity ratio of the organic collector.

Referring to FIG. 1, a strong leach solution 10, such as an aqueous sulfuric acid solution, passes downwardly through a heap or dump 14 of valuable metal ore and a pregnant leach solution 18 is produced which contains remaining amounts of acid in combination with valuable metal ions. In addition, the pregnant leach solution 18 contains suspended and colloidal solids from the ore heap or dump 14. The dissolved valuable metal concentration in the pregnant leach solution 18 typically ranges from about 0.001 to about 10 g/l and the suspended and colloidal solid concentration from about 0.01 to about 0.1 g/l.

The pregnant leach solution 18 is collected from the bottom of the ore heap or dump 14 or from a storage pond 16, and passed through a filtration system 22 to remove the suspended and colloidal solids from the pregnant leach solution 18. The filtration system can be any suitable filter, with ultrafiltration and microfiltration membranes being more preferred. Typical microfiltration and ultrafiltration membranes suitable for this application include MQW, E, Q, G, J, K, DL, and DS-7 series elements from Osmonics/Desal of Vista, Calif. These spiral wound elements use sulfonated polysulfone, polyether sulfone, polysulfone, polyacrylonitrile, PTFE (Teflon), PVDF, polyarimid, and/or surface-modified structures of the aforementioned membrane materials. These membranes span the microfiltration/ultrafiltration membrane category, with molecular weight cut-offs ("MWCO") preferably ranging from about 3,000 to about 100,000 MWCO and more preferably from about 5,000 to about 100,000 MWCO and pore sizes preferably ranging from about 0.003 microns to about 1 microns and more preferably from about 0.003 microns to about 0.1 micron.

The filtration system separates the pregnant leach solution 18 into two streams: permeate 26 and retentate 30. The retentate 30 stream includes substantially all of the suspended solids and colloidal solids in the pregnant leach solution 18. The concentration of the suspended and colloidal solids in the retentate is typically at least about 105% of their concentration in the pregnant leach solution 18 and typically ranges from about 0.01 to about 10 g/l. The permeate 26 is substantially free of suspended and colloidal solids. Typically, the concentration of suspended and colloidal solids in the permeate is no more than about 0.001 g/l. However, the leaching agent and valuable metal ions in the pregnant leach solution 18 are commonly not rejected by the filtration system, and the amount of each that remains in the retentate and permeate streams is directly proportional to the volume of each stream. For this reason, as much as possible of the pregnant leach solution volume is in the permeate.

The permeate 26 may be sent directly to the SX/EW plant 34 (or, alternatively, an IX/EW plant which is not shown) for valuable metal recovery. It may also be sent to a nanofiltration system (not shown) for valuable metal ion concentration, followed by processing through the valuable metal recovery plant 34.

The retentate 30 may be sent to the settling pond 16 for deposition of the suspended and colloidal solids, followed optionally by processing through the filtration system 22 and a nanofiltration membrane system (not shown), and, eventually, the valuable metal recovery plant 34. The retentate 30 may also be returned to the ore heap or dump, where many of the suspended and colloidal solids will be filtered out as the liquid passes through the heap.

Presently, most copper mining operations are not treating the pregnant leach solution to remove suspended and colloidal solids. During periods of high suspended solids in the pregnant leach solution (such as rain or storm events), the SX/EW or copper recovery plants are shut down until the event is over and the suspended and colloidal solids return to normal levels. The cost of shutting down during a storm event (lost production) was estimated at $1.5 million dollars per day for one copper mining facility. With five to ten storm events per year in even dry or desert climates, the ability to filter out suspended solids and avoid process shut-downs has significant economic value.

Filtration of the Rich Stripping Solution

In the second embodiment of the present invention, the rich stripping solution is subjected to filtration prior to recovery of the valuable metal to remove one or more contaminants. The contaminants can include one or more multi-valent metals (except when the valuable metal to be recovered is itself a multi-valent metal or is present in a compound having a size larger than the multi-valent metal compound), organic collector carried over into the rich stripping solution, and/or suspended and colloidal solids carried over into the stripping solution from the lix. Typically, the contaminant to be removed is an organic collector and/or suspended and/or colloidal solids, and the second embodiment will be discussed below only with reference to these contaminants.

The retentate contains most, if not all, of the contaminant and, at most, only a small portion of the valuable metal, and the permeate (which contains at least most of the valuable metal) is preferably substantially free of organic materials and suspended solid and colloidal solids. Preferably, the retentate comprises at least about 95% and more preferably at least about 99% of the organic collector and suspended and colloidal solids in the rich electrolyte solution.

By recovering the organic collector in the retentate or concentrate, the process can reduce, or eliminate, organic collector in the electrowinning tank house and can recover the organic collector from the concentrate for reuse. The substantial absence of residual organic collector from the electrowinning tank house addresses many inherent problems in copper electrowinning, including low current efficiency, poor copper product quality, and poor copper removal from the stainless steel cathode electrode.

The filter is preferably a micro- or ultrafilter. The filter preferably has a pore size ranging from about 30 Å (or 0.003 microns) to about 10,000 Å (or 1 micron) and more preferably ranging from about 50 Å (or 0.005 micron) to about 1,000 Å (0.1 micron). Preferred microfiltration and ultrafiltration membranes used would be MQW, G, J, K, DS-7 and Q series elements from Osmonics/Desal of Vista, Calif. These spiral wound elements use poly acrylonitrile, PTFE (Teflon), PVDF, polyarimid, polysulfone, polyether sulfone, sulfonated polysulfone, and/or surface-modified structures of the aforementioned membrane materials. The most preferred membranes span the microfiltration/ultrafiltration membrane category, with molecular weight cut-offs of about 3,000 to about 200,000 MWCO and pore sizes of about 0.003 micron to about 0.1 micron.

The filtration step preferably causes the retentate to constitute less of the stripping solution than the permeate, and the permeate comprises at least most of the electrolyte in the stripping solution. More preferably, the retentate constitutes no more than about 50% by volume and most preferably no more than about 5% by volume of the stripping solution. More preferably, the permeate constitutes at least about 50% by volume and most preferably at least about 95% by volume of the stripping solution.

Figure 2:
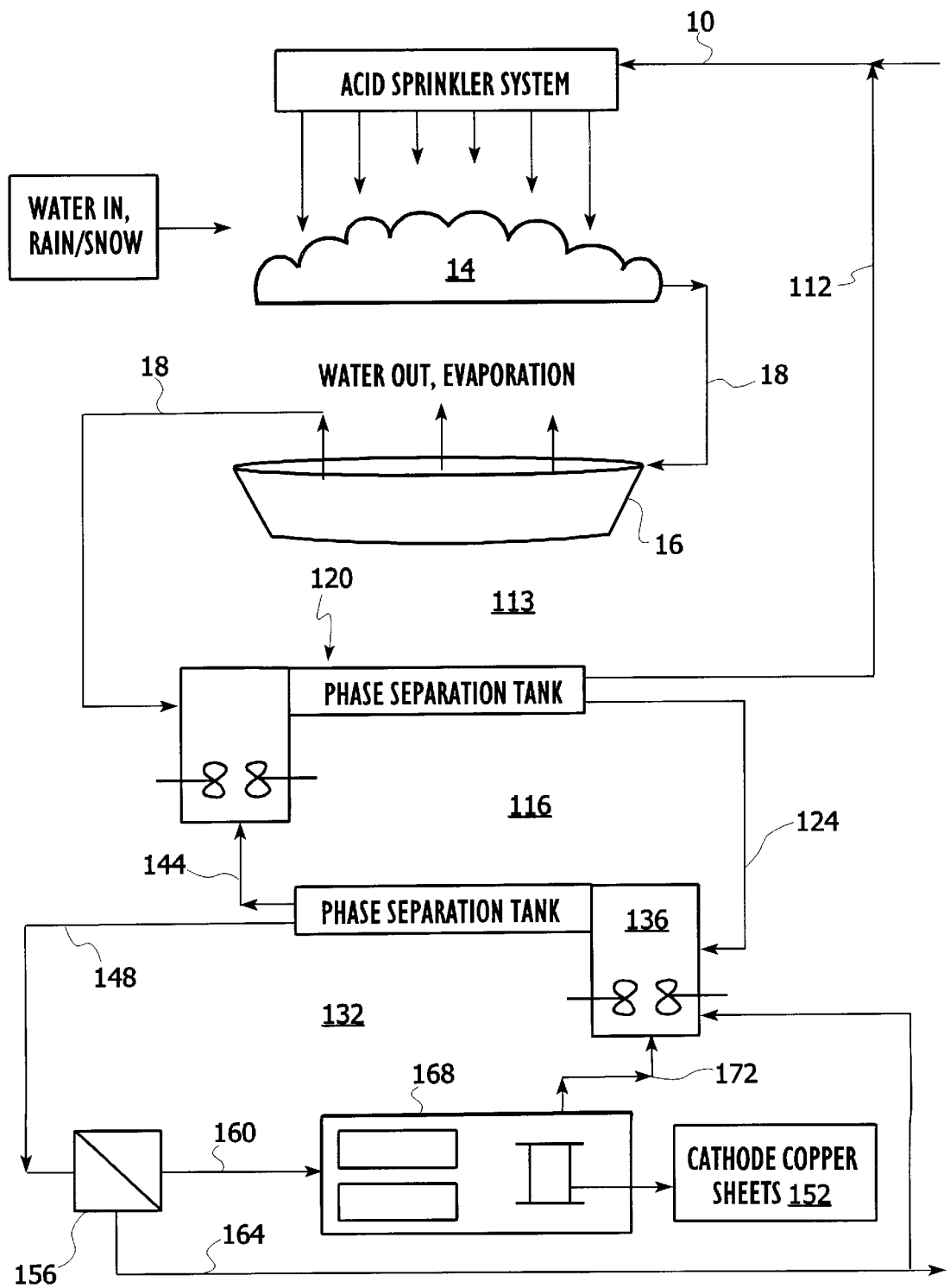
FIG. 2 is a flow schematic depicting a process according to a second embodiment of the present invention.

Referring to FIG. 2, the pregnant leach solution 18 in the first (leaching) loop 113, containing dissolved valuable metal ions and possibly other dissolved metals, is fed to a mixer/settler tank 120 where it is contacted with an organic collector (e.g., a lix). The "lix" 144 preferentially extracts from about 70% to about 90% of the valuable metal ions from the pregnant leach solution 18 into a loaded organic solvent 124. The organic collector forms compounds with the valuable metal ions. The mixture forms two phases in the phase separation tank 120—an organic phase (which contains at least most of the valuable metal in the pregnant leach solution) and an aqueous phase. The organic phase is removed to form the loaded organic solvent 124. The aqueous phase is removed to form the raffinate 112. The organic phase commonly has a concentration of suspended and colloidal solids ranging from about 0.01 to about 1 g/l.

In a second (collecting) loop 116, the loaded organic solvent 124 is contacted in a mixer/settler tank 136 with a barren electrolyte stream or stripping solution 172 from the electrowinning circuit. The valuable metal ions are transferred from the loaded organic solvent 124 to the electrolyte stream 172 to form a rich electrolyte or stripping solution 148. The resulting mixture forms two phases—a lean organic solvent 144 and a rich electrolyte 148 (which contains at least most of the valuable metal in the loaded organic solvent 124). The two phases are separated with the organic solvent 144 being recycled to the mixer/settler tank 120 and the rich electrolyte 148 being further treated for valuable metal recovery. Typically, the rich electrolyte contains from about 0.001 to about 1 g/l suspended and colloidal solids and from about 0.001 to about 1 g/l organic collector.

In a third and final closed (electrowinning) loop 132, the rich electrolyte 148 exiting the mixer/settler tank 136 is passed through a microfiltration or ultrafiltration membrane system 156. The filtration system 156 separates the rich electrolyte 148 into two streams: permeate 160 (containing at least most of the valuable metal in the rich electrolyte) and retentate 164. The retentate 164 consists of substantially all the entrained organic collector and suspended and colloidal solids in the rich electrolyte 148. The permeate 160 is preferably substantially free of organic collector and suspended and colloidal solids and is sent directly to the electrowon tank house 168. Preferably, the permeate contains no more than about 0.001 g/l suspended and colloidal solids and no more than about 0.005 g/l organic collector.

In the electrowon tank house 168, the permeate solution 160 flows between a cathode plate and an insoluble anode, where about 70 to about 90% of the valuable metal is removed through "electroplating". In the case of copper, the electrochemical cell "plates" a stainless steel electrode (cathode) with copper using an applied current. The copper plated cathode plates are then periodically removed from the process to obtain a solid, high-purity copper product.

The retentate 164 is sent directly back to the mixer tank 136 where the lean electrolyte 172 is contacted with the loaded organic solvent 124. The organic collector in the retentate 164 is reused with this method, thereby reducing losses of organic collector. Presently, copper mining operations are trying to remove organic collector from the rich electrolyte by decantation, centrifuging, or coarse filtration in an attempt to maintain a high quality copper product and recover the expensive organic collector. For example, at one mine organic losses from the rich electrolyte are estimated at $50,000 to $500,000 per year. The economic loss due to derating copper quality from Grade A cathode quality is also reported as very significant by those well versed in the art. It is clear that using a membrane system 156 to remove the entrained organic offers significant, direct process and operating cost advantages. In addition, removal of the entrained organic collector prevents a serious safety problem in the electrowin tank house. Localized organic vapor build-up in the tank house has caused serious explosions at existing SX/EW facilities.

Filtration of the Rich and Lean Organic Collector

As will be appreciated, the collector that is valuable metal rich (i.e., which is loaded with the valuable metal directly after contact of the collector with the pregnant leach solution) or valuable metal lean (i.e., which has less valuable metal than the rich collector because it has been stripped of valuable metal by the stripping solution) can also be subjected to membrane filtration to remove suspended and colloidal solids. The membrane filters would have a pore size sufficient to pass most, and preferably substantially all, of the collector but small enough to reject most, and preferably substantially all, of the suspended and colloidal solids. The membrane filtration of the rich or lean organic collector is further discussed in U.S. Pat. No. 5,733,431 filed Aug. 21, 1996, and issued Mar. 31, 1998, and copending application Ser. No. 09/052,869, filed Mar. 31, 1998, which are incorporated herein by reference in their entireties.

Filtration of the Lean or Barren Electrolyte

Figure 3:
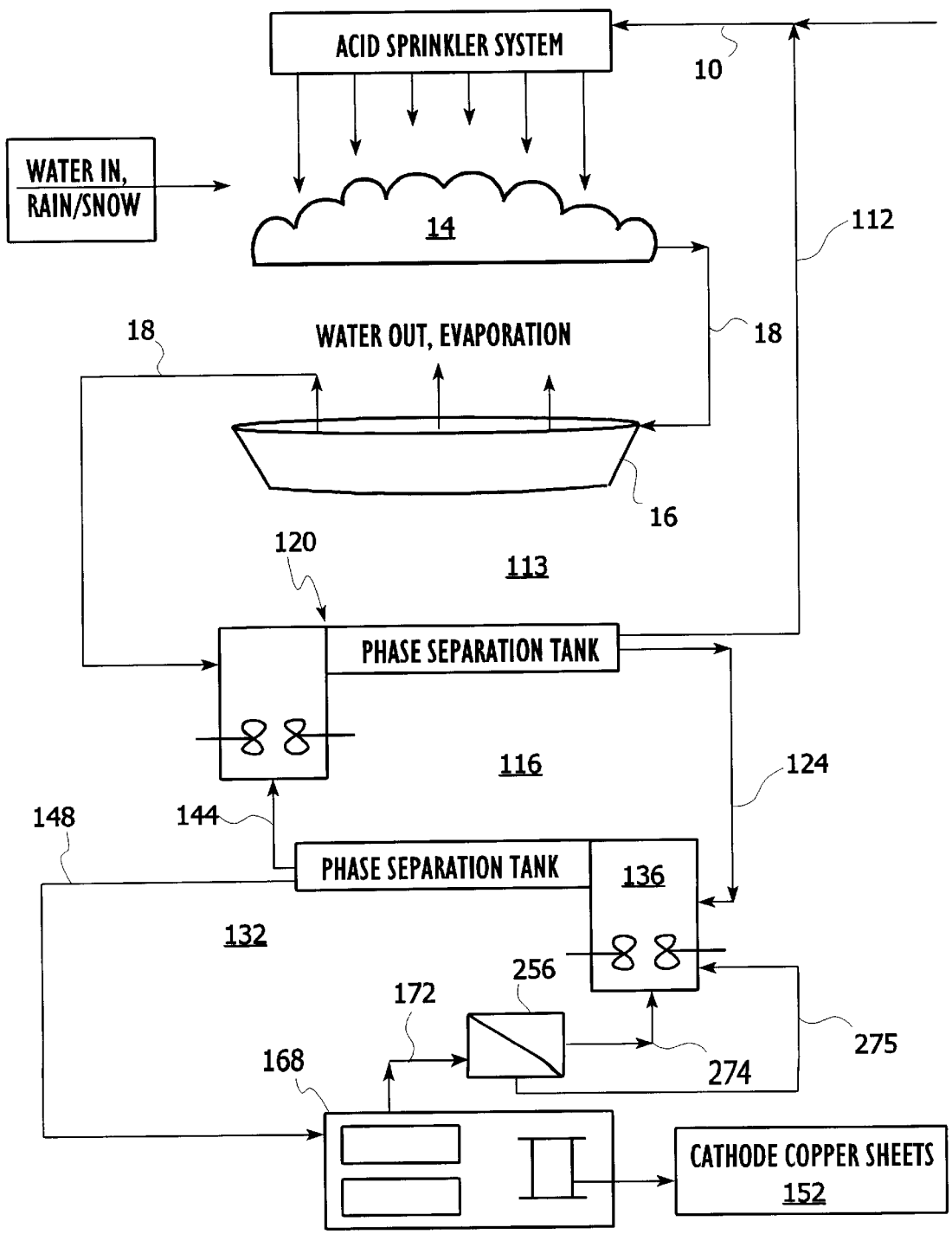
FIG. 3 is a flow schematic depicting a process according to a third embodiment of the present invention.

Alternatively, as shown in a third embodiment depicted in FIG. 3, the filtration system 256 can be applied to the lean electrolyte 172, after the electrowinning step, in which case both the permeate 274 and the retentate 275 would report to the mixer tank 136.

In either embodiment, the filtration system 156 or 256 could process approximately 100–10,000 gallons per minute of rich electrolyte, with approximately 40–95% of the feed flow becoming permeate product (organic-free). A typical system would process about 1,000 gpm of electrolyte through each of a plurality of 8-inch spiral wound MQW membrane elements. The system would split the feed flow into 900 gpm of permeate 60 and 100 gpm of concentrate.

In a fourth embodiment of the present invention, filtration is performed on the lean electrolyte to remove multi-valent ions and thereby prevent the build-up of these ions in the electrowinning circuit and consequent deterioration in valuable metal recoveries. In the lean electrolyte and the pregnant leach solution, the unrecovered valuable metal (e.g. copper, cobalt and nickel) is commonly present as a metal sulfate.

The contaminate metals can detrimentally affect the efficiency of the electrolytic recovery of the valuable metal, particularly in high concentrations of the contaminate metals. The contaminate metals are preferably present as tri-valent or di-valent metals including iron, manganese, lead, other tri-valent ions, and di-valent and other ion complexes that are larger than the valuable metal sulfate complex. To form the multi-valent ions into sulfates in the lean electrolyte, sulfate ions can be introduced after electrowinning by techniques known in the art.

In some applications, filtration can also be used to remove other multi-valent metals, including valuable multi-valent metals, from the lean electrolyte. Such metals include copper, cobalt, nickel, zinc, cadmium, calcium, and magnesium. The removal of these metals can be beneficial, such as when copper is the valuable metal and it is desired to solubilize a high percentage of the copper attached to the loaded organic solvent.

The above-identified metal complexes can be removed with a suitable filtration system. The valuable metal containing solution, i.e. lean "electrolyte" from a valuable metal process, is passed through a filtration system to produce a retentate containing the majority of the ionic contaminants and a permeate containing a minority of the ionic contaminants. The retentate is discharged as a small bleed stream to the barren raffinate or to waste. The permeate is returned to the rich electrolyte for valuable metal recovery. The membrane filtration of the lean electrolyte results in reduced bleed stream volumes, immediate recovery of additional valuable metal in the EW, reuse of an expensive cobalt metal additive, recovery of sulfuric acid, reduction in bleed stream neutralization requirements, and overall lower SX/EW operating costs.

Filtration can be performed using a variety of ultrafiltration or nanofiltration membranes. Preferably, the filter has a pore size ranging from about 5 angstroms (or 0.005 microns) to about 500 angstroms (or 0.05 microns) and more preferably from about 10 angstroms (or 0.001 microns) to about 100 angstroms (or 0.01 microns). The filter preferably has molecular weight cut-offs ranging from about 100 to about 20,000 MWCO. Preferred ultrafiltration membranes used would be G series elements (G-5, G-10, G20) from Osmonics/Desalination Systems of Vista, Calif., and preferred nanofiltration membranes used would be DL or DK series elements from Osmonics/Desalination Systems of Vista, Calif. A typical system would process 100 gpm of electrolyte through each of a plurality of 8-inch spiral wound G-5 membrane elements.

Filtration is conducted such that an optimal amount, based on maximum difference between ionic contaminants and valuable metal, of the barren electrolytic solution is contained in the permeate. The retentate preferably comprises no more than about 95% of the barren electrolytic solution and more preferably no more than about 25% of the barren electrolytic solution. In contrast, the permeate preferably comprises at least about 5% of the barren electrolytic solution and more preferably at least about 75% of the barren electrolytic solution.

Filtration removes a substantial amount of the contaminate metals from the permeate and places them in the retentate. Preferably, the contaminant metal concentration is reduced by at least about 5% and more preferably by at least about 25% in the permeate compared to that in the barren electrolyte solution. In contrast, the retentate preferably comprises at least about 105% and more preferably at least about 125% of the contaminate metal levels in the barren electrolytic solution (before filtration).

Although the filter typically will not fully reject the valuable metal to the retentate, the concentration of the valuable metal in the retentate is typically slightly more than the valuable metal in the permeate. However, the filter has a significantly higher rejection rate for the contaminant metals than for the valuable metal. Therefore, a valuable separation occurs based on mass of contaminate and mass of valuable metal in the retentate versus that of the permeate. Preferably, the rejection rate for the valuable metal ranges from about 1 to about 25% and for the contaminant metal from about 30 to about 85%. The permeate can be reused to strip the metal from the rich organic solvent.

This embodiment of a process according to the present invention can improve the metal leaching—metal recovery process to overcome inherent problems such as build-up of undesired "spectator" ions, particularly in the electrowinning loop 132. In a problem common to all mining operations, the organic extractants or "lix" chemicals are not completely selective in the metals they extract from the pregnant leach solution (PLS). For example, some iron loads onto the lix along with the desired metal. The iron is then released into the electrolyte (or stripping) circuit along with the desired metal. In addition to ion contaminant transfer from the pregnant leach solution to the electrolyte due to poor organic selectivity, ion contaminants can be transferred from the pregnant leach solution to the electrolyte due to entrainment of pregnant leach solution in the loaded organic solvent, with subsequent release of the pregnant leach solution into the electrolyte. Entrainment and organic selectivity are the main reasons for build-up of iron, manganese, and other ionic contaminants in the electrowinning circuit.

Figure 4:
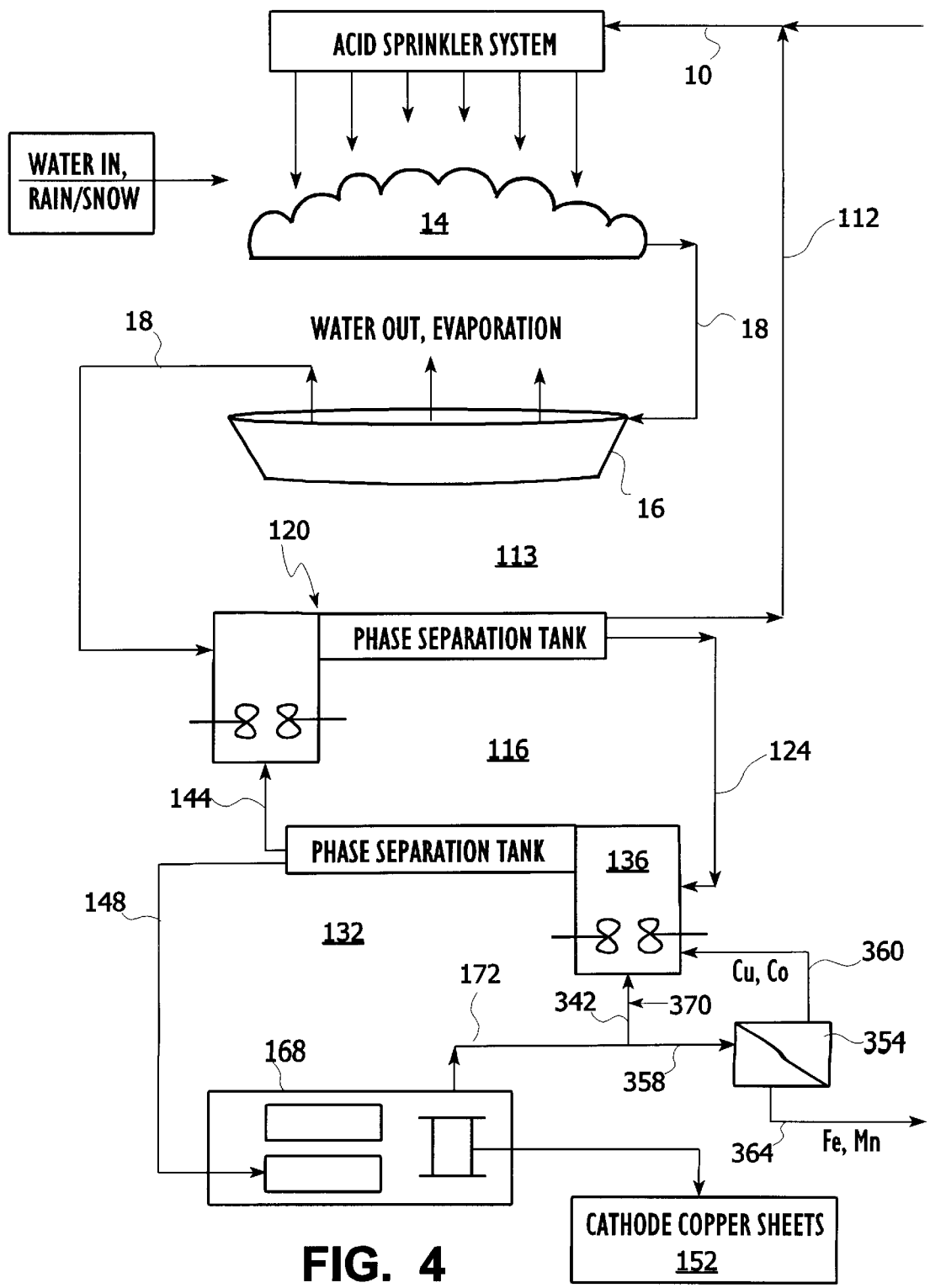
FIG. 4 is a flow schematic depicting a process according to a fourth embodiment of the present invention.

Referring to FIG. 4, the filtration system 354 processes a bleed stream 358 of the lean electrolyte 172 exiting from the electrowinning plant 168. Before entering the stripping stage 136, the small bleed stream 358 of lean electrolyte is removed, and replaced with a stream 370 consisting of clean sulfuric acid and water. The composite lean electrolyte 342, is then returned to the stripping stage to contact the loaded organic 124. The bleed stream, containing a certain concentration of undesirable metal ions, is set at a rate equal to the total amount of undesirable metal ions entering the rich electrolyte from entrainment or organic transfer. The bleed stream preferably represents from about 0.01 to about 5% and more preferably from about 1 to about 3% volume of the lean electrolyte 342.

The bleed stream 358 is passed through the filtration system 354. The filtration system 354 preferentially rejects higher percentages of iron, manganese, other trivalent ions, and/or ion complexes larger than the valuable metal sulfate complex (ion contaminants). The filtration system 354 separates the bleed stream 358 into two streams: permeate 360 and retentate 364. The retentate 364 includes at least most of the ionic contaminants in the bleed stream 358 because of the preferential rejection of ions larger than the valuable metal sulfate complex, as mentioned above. The permeate 360 includes a minority amount of the ionic contaminants; that is, the permeate has a lower contaminant concentration than the bleed stream 358.

The permeate 360, which comprises at least about 5% vol. and morestreferably at least about 75% vol. of the bleed stream with approximately 75% vol. of the bleed stream being common, reports back to the electrowinning circuit 132. The retentate 364 which comprises preferably no more than about 95% vol. and more preferably no more than about 25% vol. of the bleed stream, with approximately 25% vol. of the bleed stream being typical, is discharged to the raffinate 112 or pond 16 for reuse in ore leaching.

The system would process 10–1,000 gallons per minute of electrolyte, with about 5%–75% of the feed flow becoming permeate product. The system would split the feed flow into 75 gpm of permeate and 25 gpm of retentate, with about a 25%–50% difference in rejection between copper and iron.

In a fifth embodiment of the present invention, the barren stripping solution for the collector is passed through a filter to remove solubilized valuable metal ions and form a treated stripping solution and a retentate containing the solubilized valuable metal ions. The treated stripping solution, having a lowered valuable metal concentration, is used to strip the valuable metal from the collector at high rates. This is so because the concentration driving force for the valuable metals on the resin to be solubilized by the treated stripping solution is relatively aggressive (e.g., purer sulfuric acid/water solution) due to the absence of metal ions from the treated stripping solution and a concentrated copper-rich electrolyte for direct electrowinning. This process improves the IX/EW copper recovery process through more efficient valuable metal stripping from the ion exchange resin, and higher valuable metal concentrations for electrowinning.

The filtration step is preferably performed using a nanofiltration or ultrafiltration membrane. Preferred nanofiltration membranes have a pore size ranging from about 5 Å (or 0.0005 microns) to about 100 Å (or 0.01 microns), more preferably from about 7 Å (or 0.0007 microns) to about 50 Å (or 0.005 microns), and most preferably from about 8 Å (or 0.0008 microns) to about 20 Å (or 0.002 microns). Preferred ultrafiltration membranes are G series elements from Osmonics/Desalination Systems of Vista, Calif., and preferred nanofiltration membranes are DK series elements from Osmonics/Desalination Systems of Vista, Calif. A typical system would process about 500 gpm of electrolyte through each of a plurality of 8-inch spiral wound DK membrane elements.

Figure 5:
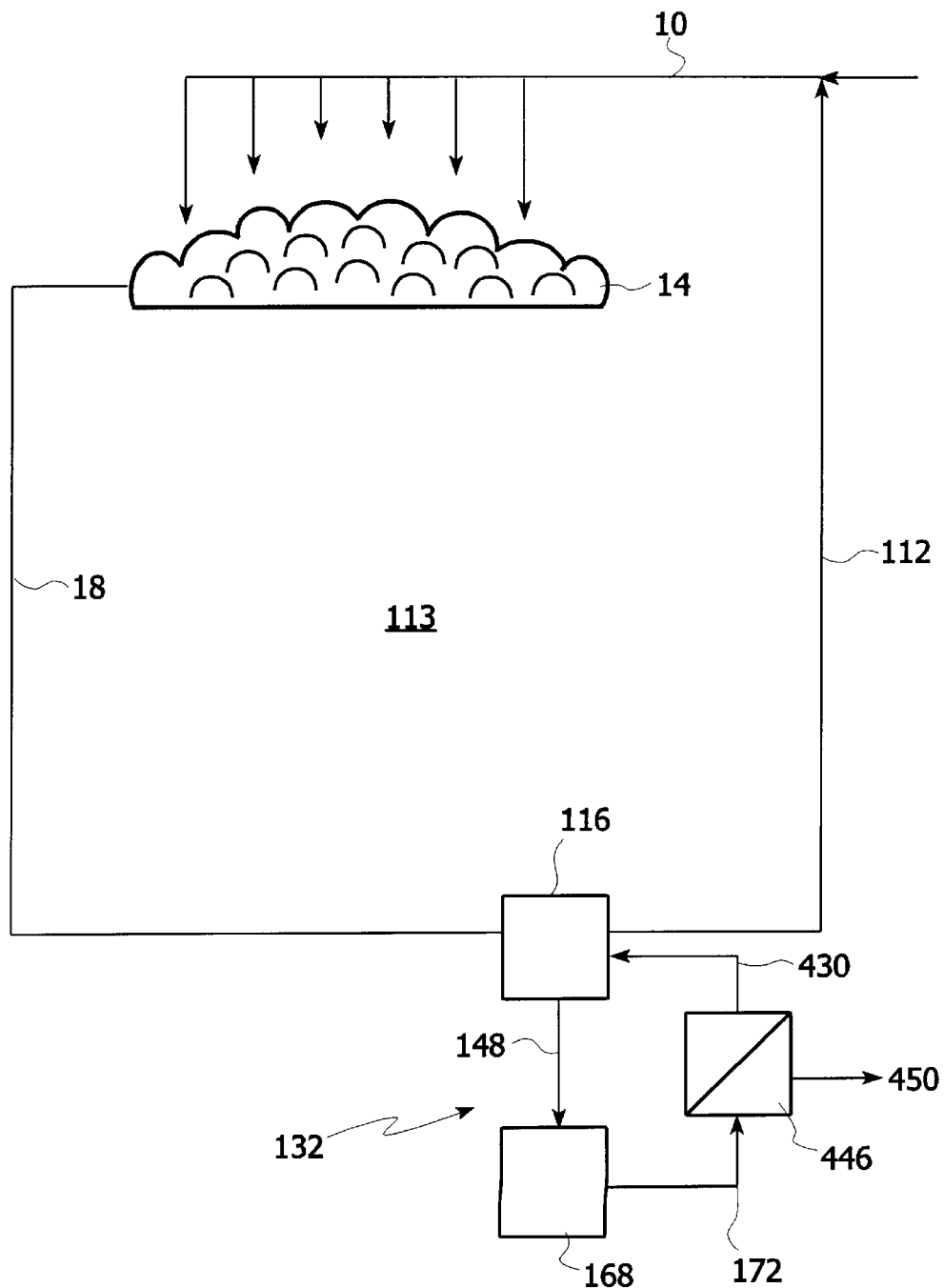
FIG. 5 is a flow schematic depicting a process according to a fifth embodiment of the present invention.

An embodiment of the present invention is shown in FIG. 5. All or a portion of the "lean electrolyte" 172 is processed through the filtration system 446. The filtration system 446 separates the lean electrolyte into two streams: the treated stripping solution 430 and retentate 450. The retentate 450 includes the majority, more preferably at least about 75% and most preferably at least about 98% of the valuable metal ions present in the lean electrolyte 172. The treated stripping solution 430 consists of a minority and more preferably no more than about 10% of the valuable metal ions. However, the leaching agent is generally not separated by the ultrafiltration or nanofiltration membranes, and it remains equally in the retentate 450 and treated stripping solution streams 430.

The retentate preferably constitutes less of the stripping solution volume than the permeate. Preferably, the permeate is at least about 35 and more preferably at least about 75% of the stripping solution volume.

The treated stripping solution 430 is used for the stripping and rinsing steps of the rich organic phase and ion exchange resin. The clean, high acidity treated stripping solution 430 provides a superior solution for these process steps. The retentate stream 450 is returned to the electrowinning circuit 132 for valuable metal recovery.

The filtration system 446 can process all or only a bleed stream of lean electrolyte 172 from the electrowinning circuit 168. The bleed stream (not shown) preferably constitutes from about 0.01 to about 25% vol. of the lean electrolyte 172.

The filtration system 446 would preferably process from about 10 to about 1,000 gallons per minute of lean electrolyte 172, with from about 35 to about 75% vol. of the feed flow becoming permeate product. For copper recovery, the system would split the feed flow into 250 gpm of permeate and 250 gpm of retentate, with at least about 75% and more preferably at least about 98% rejection of the copper ions into the retentate stream. About 90% rejection of the copper is common.

Filtration of the Raffinate Stream

In the sixth embodiment, contaminant metals and/or water are removed from the raffinate stream after valuable metal extraction therefrom. This is accomplished by filtering all or a portion of the raffinate solution to remove the undesired metal and/or water from the depleted leach solution.

The method is particularly effective in removing contaminate metals, or spectator ions, from the raffinate solution. The filtering step can form a retentate containing at least about 20%, more preferably at least about 50%, and most preferably at least about 90% and a permeate containing a concentration of the undesired metal in the permeate of no more than about 80%, more preferably no more than about 50% and most preferably no more than about 10% of the undesired metal in the raffinate solution. The permeate can be recycled to the leaching step as a cleaner, more aggressive lixiviant for enhanced metal recoveries. The permeate can also be removed either as a bleed stream or otherwise from the recycle loop to provide water balance in the leaching circuit.

The filtering step is preferably performed using a ultrafiltration or nanofiltration membrane. Preferred membranes have a pore size ranging from about 5 Å (or 0.0005 microns) to about 100 Å (or 0.01 microns), more preferably from about 7 Å (or 0.0007 microns) to about 50 Å (or 0.0005 microns), and most preferably from about 8 Å (or 0.0008 microns) to about 20 Å (or 0.002 microns). Preferred ultrafiltration membranes used would be G series elements from Osmonics/Desalination Systems of Vista, Calif., and preferred nanofiltration membranes used would be DK series elements from Osmonics/Desalination Systems of Vista, Calif. A typical system would process about 1,000 gpm of raffinate through each 8 inch spiral wound DK membrane element.

Additionally, a metal ion-extracting material (e.g., biomass materials) on a bed of porous polymer beads can be used in conjunction with the membranes to provide high undesired metal removal rates.

Figure 6:
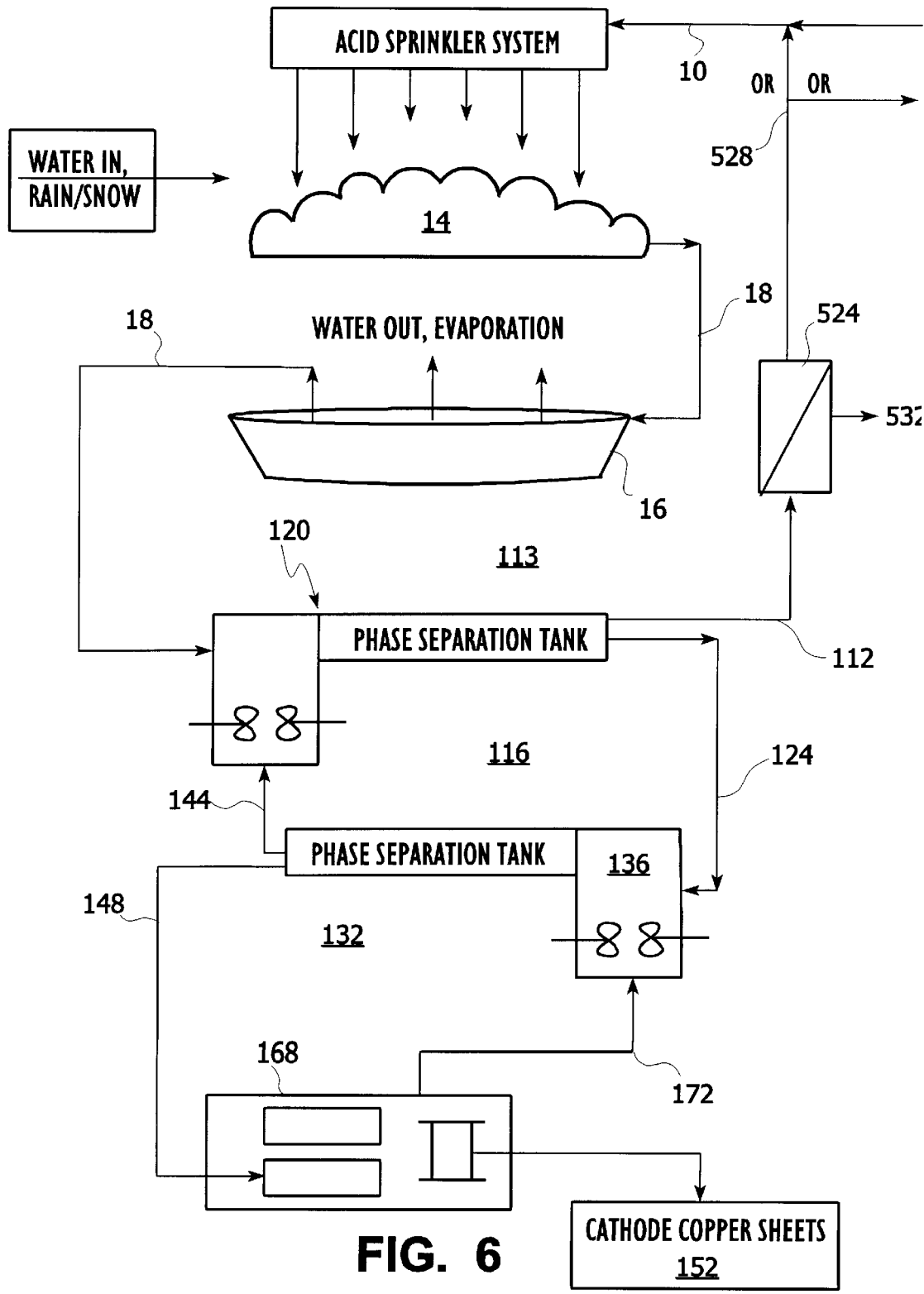
FIG. 6 is a flow schematic depicting a process according to a sixth embodiment of the present invention.

The sixth embodiment of the present invention is shown in FIG. 6. Prior to collection or recycle, the raffinate 112 is processed through a filtration system 524. The filtration system separates the raffinate into two streams: permeate 528 and retentate 532. The retentate 532 includes the majority of the contaminant metal ions in the raffinate, and the permeate 528 consists of a minority of the containment metal ions. However, the leaching agent is typically not rejected by the filtration system 524, and it remains in volumetric proportions in the retentate 532 and permeate 528.

The retentate 532 preferably constitutes less of the raffinate volume 112 than the permeate 528. The retentate 532 preferably constitutes no more than about 65 and more preferably no more than about 50% vol. of the raffinate 112, while the permeate 528 constitutes at least about 35% and more preferably at least about 50% vol. of the raffinate 112.

The permeate stream 528 may be removed from the leaching circuit 112, eliminating a water balance problem in the leaching circuit 113. The permeate 528 may be ultimately used as process water elsewhere in the mine, or neutralized and discharged from the mine. The permeate 528 (basically clean aqueous leaching agent) may also be sent to the top of the ore heap or dump 14 for use as an enhanced lixiviant. It is well known in the art that a low metals, low TDS sulfuric acid provides a better lixiviant for copper than a high metals, high TDS, saturated sulfuric acid solution (such as the raffinate).

The retentate stream 532 may be sent to a raffinate collection pond 16, used to leach specific ore heaps or dumps, or be removed entirely from the leaching circuit 113. Removing the retentate 532 from the leaching circuit 113 would provide a way to remove unwanted spectator ions from the leaching circuit 113. The retentate 532 would be collected in a pond 16, neutralized for discharge, or reused in the leaching circuit 113.

Presently, copper mining operations are using lime precipitation systems to neutralize and discharge raffinate from the leach circuit to control problems such as a positive water balance and high concentration of unwanted spectator ions. Using a membrane system instead of a precipitation system or a membrane system together with a precipitation system offers significant process and operating cost advantages. For example, the precipitation system needs only to treat the retentate stream from the membrane system, while the permeate stream from the membrane system is a valuable product for enhanced leaching, if undesired metal ions are removed. Conversely, the precipitation system could teat the permeate stream from the membrane system, to provide low cost water balance control.

The membrane system in question would process from about 100 to about 20,000 gallons per minute of raffinate, with typically about 35 to about 75% and more typically about 40 to about 60% of the feed flow becoming permeate product.

A typical filtration system would split the feed flow into 500 gpm of permeate and 500 gpm of concentrate. The retentate or some percentage thereof (containing high levels of spectator ions) would be precipitated, and the neutral water reused elsewhere in the mine. The neutral water may also be re-acidified and used for leaching water. The permeate (containing low levels of spectator ions) would be returned to the top of the ore heap or dump for enhanced leaching of copper. Or, the permeate may be precipitated for low cost water balance control, while the retentate is returned to the top of the ore heap.

In the seventh embodiment, the raffinate is filtered to form a retentate containing at least most of the collector in the raffinate and a permeate. The process can further include the steps of contacting the permeate with metal-containing material and recovering the collector from the retentate. By separating the collector in the retentate, the process can reduce, or eliminate, carry over of the organic collector into the leaching step and permits recovery and reuse of the collector in the extraction step. The process thereby provides a large, direct economic benefit and eliminates coating of the ore to be leached with the collector.

The filter is preferably a microfilter or an ultrafilter. The filter preferably has a pore size ranging from about 0.003 to about 0.1 micron and more preferably ranging from about 0.01 to about 0.05 micron. Preferred microfiltration and ultrafiltration membranes used would be MQW, Q, E, DL, G, J, K, and DS-7 series elements from Osmonics/Desalination Systems of Vista, Calif. These spiral wound elements use poly acrylonitrile, PTFE (Teflon), PVDF, polysulfone, polyethersulfone, sulfonated polysulfone, polyarimid, and/or surface-modifications of the aforementioned membrane materials. The described membranes span the microfiltration/ultrafiltration membrane category, with molecular weight cut-offs of about 5,000 to 100,000 MWCO and pore sizes of about 0.003 micron to 0.1 micron. A typical system would process about 1,000 gpm of raffinate through each of a plurality of 8 inch spiral wound MQW membrane elements.

The filtration step preferably causes the retentate to constitute less of the raffinate than the permeate. More preferably, the retentate constitutes no more than about 20% and most preferably no more than about 5% of the stripped pregnant leach solution. More preferably, the permeate constitutes at least about 80% and most preferably at least about 95% of the stripped pregnant leach solution.

The permeate comprises an amount of leaching agent that is in volumetic proportion to the premeate/retentate volumes. More preferably, the permeate comprises at least about 60% and more preferably at least about 95% of the leaching agent in the raffinate.

The retentate preferably comprises at least most of the collector in the raffinate. Preferably, the retentate comprises at least about 90% and more preferably at least about 99% of the collector in the raffinate.

Figure 7:
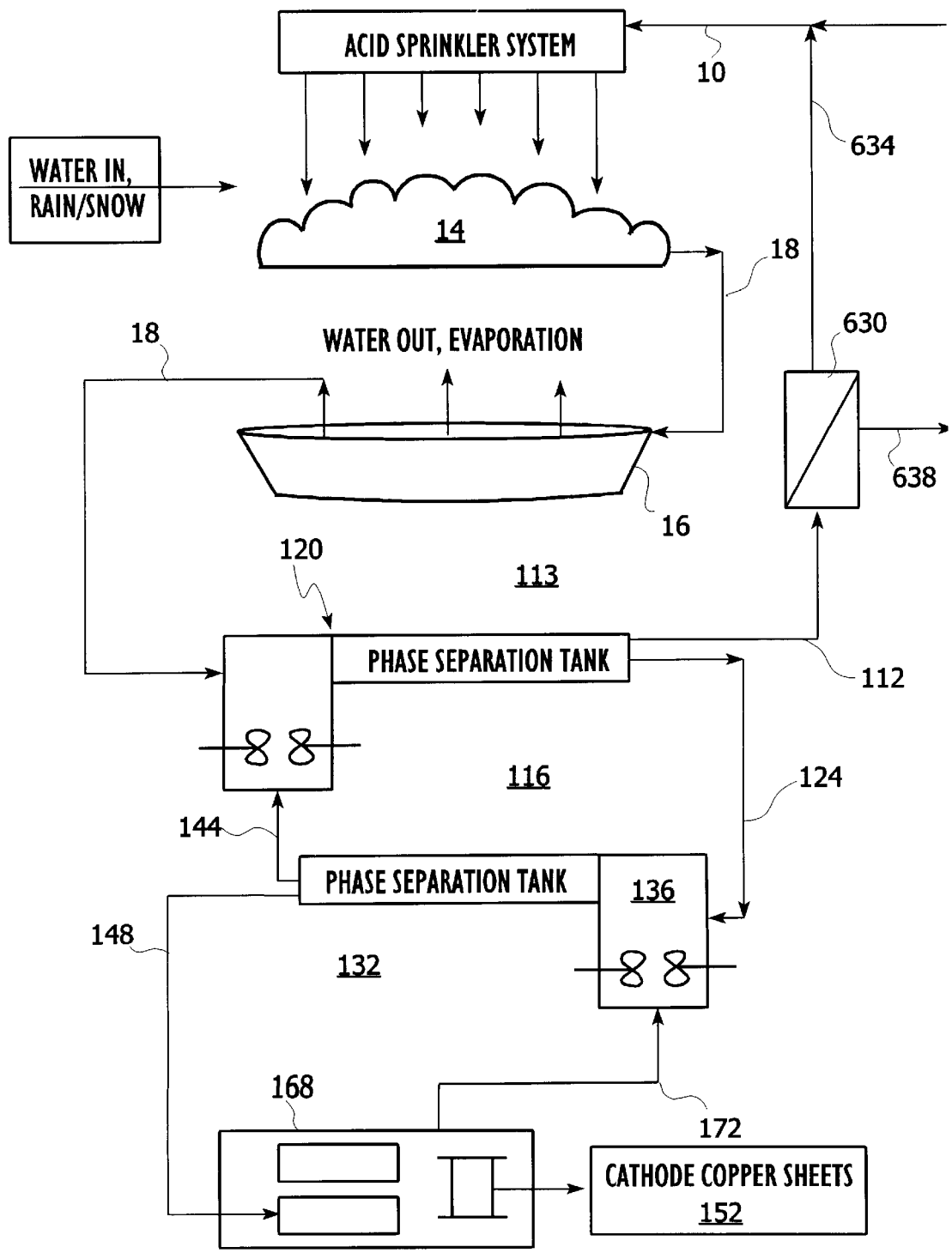
FIG. 7 is a flow schematic depicting a process according to a seventh embodiment of the present invention.

Referring to FIG. 7, the raffinate 112 is processed through a filtration system 630. The filtration system 630 separates the raffinate 112 into two streams: permeate 634 and retentate 638. The retentate 638 preferably includes substantially all of the entrained collector in the raffinate. The permeate 634 is preferably a substantially organic-free solution to be sent directly to the ore heap for leaching.

The retentate 638 may be sent to a raffinate collection pond 16, used to leach specific ore heaps or dumps, be removed from the leaching circuit or sent directly to the phase separation tank 120. It may also be further processed using a separate phase separation tank to skim off the concentrated collector.

Presently, copper mining operations are discharging raffinate with little or no attempt to recover entrained organic collector. Economic losses of organic collector have been reported as $1–2 million dollars/year for medium sized copper SX-EW facilities. This demonstrates that using a membrane system to recover the entrained organic collector offers significant, direct process and operating cost advantages. In addition, the reduction of coating of the ore by the organic collector has a positive effect on leaching efficiency.

The filtration system would process about 100 to about 20,000 gallons per minute of raffinate, with about 80–95% of the feed flow becoming the permeate. The system would split the feed flow into about 900 gpm of permeate and about 100 gpm of retentate.

EXPERIMENTAL

Example 1

In a recent field test of the process depicted in FIG. 4, an electrolyte containing ionic contaminants was split into two strems as follows:

|    | Feed      | Permeate  | Rejection |
|----|-----------|-----------|-----------|
| Cu | 2.44 g/L  | 2.0 g/L   | 18%       |
| Fe | 3040 ppm  | 1920 ppm  | 37%       |
| Mn | 36.4 ppm  | 28.9 ppm  | 21%       |

The primary ionic contaminant, iron, was rejected at a 20% higher rate than copper. Discharging the retentate allows a significant reduction in bleed stream volume to maintain the same total amount of iron discharged from the electrowinning circuit.

In another recent field test of this process, a different electrolyte containing ionic contaminants was split into two streams as follows:

|    | Feed      | Permeate  | Rejection |
|----|-----------|-----------|-----------|
| Cu | 34.2 g/L  | 26.5 g/L  | 22.5%     |
| Fe | 1.94 g/L  | 1.05 g/L  | 46%       |
| Mn | 79 ppm    | 61 ppm    | 23%       |
| Co | 172 ppm   | 142 ppm   | 17%       |

The primary ionic contaminant, iron, was rejected at about a 24% higher rate than copper. Again, discharging the retentate allows a significant reduction in bleed stream volume to maintain the same total amount of iron discharged from the electrowinning circuit. In addition, cobalt, a valuable metal which is added to the electrolyte to assist in electrowinning, is rejected at a lower rate than copper. Therefore, a portion of the valuable cobalt metal reports with the permeate back to the electrowinning circuit.

While various embodiments to the present invention have been described in detail, it is apparent that modifications and adaptations of those embodiments will occur to those skilled in the art. However, it is to be expressly understood that such modifications and adaptations are within the spirit and scope of the present invention as set forth in the following claims.

What is claimed is:

1. A method for recovering a metal from a metal-containing material, comprising:
    (a) contacting a lixiviant with the metal-containing material to form a pregnant leach solution in which at least a portion of the metal in the metal-containing material is dissolved;
    (b) contacting the lixiviant with a collector to form a loaded collector comprising at least most of the metal in the pregnant leach solution and a stripped raffinate solution;
    (c) contacting the loaded collector with a stripping solution to form a stripped collector and a rich stripping solution comprising at least most of the metal in the loaded collector wherein at least one of the rich stripping solution, the pregnant leach solution, a barren stripping solution derived from the rich stripping solution, and the stripped raffinate solution include a contaminant;
    (d) filtering at least a portion of the at least one of the rich stripping solution, the pregnant leach solution, a barren stripping solution derived from the rich stripping solution, and the stripped raffinate solution with a filter to form a retentate containing the contaminant and a permeate; and
    (e) recovering at least a portion of the metal in the rich stripping solution to form the barren stripping solution.

2. The method of claim 1, wherein the contaminant is at least one of a suspended and colloidal solid.

3. The method of claim 2, wherein the filtering step is applied to at least a portion of the pregnant leach solution.

4. The method of claim 2, wherein the filter has a pore size ranging from about 30 to about 1000 angstroms.

5. The method of claim 1, wherein the collector is an organic collector and the contaminant is the organic collector and further comprising recycling the retentate to step (b).

6. The method of claim 5, further comprising recovering the organic collector from the retentate.

7. The method of claim 5, wherein the organic collector is selected from the group consisting of hydroxy phenyl oximes, alamines, and mixtures thereof.

8. The method of claim 5, wherein the filter has a pore size ranging from about 30 to about 1000 angstroms.

9. The method of claim 5, wherein the filtering step is applied to at least one of the stripped raffinate solution, the barren stripping solution, and the rich stripping solution.

10. The method of claim 1, wherein the metal is selected from the group consisting of copper, gold, silver, zinc, cobalt, uranium, nickel, and mixtures thereof.

11. The method of claim 1, wherein the lixiviant comprises a leaching agent selected from the group consisting of sulfuric acid, hydrochloric acid, nitric acid, a chloride, a nitrate, ammonia, ammonium salts, a sulfate, a cyanide, a thiocyanate, a hydroxide, a carbon dioxide, an oxygen, and mixtures thereof.

12. The method of claim 1, wherein the contaminate is selected from the group consisting of iron, manganese, lead, nickel, arsenic, bismuth, antimony, and mixtures thereof.

13. The method of claim 12, wherein the filter has a pore size ranging from about 5 to about 500 angstroms.

14. The method of claim 1, wherein the contaminate is a trivalent metal ion and wherein the filtering step is performed on the barren stripping solution.

15. The method of claim 1, wherein the retentate constitutes no more than about 50% of the at least one of the rich stripping solution, the pregnant leach solution, the barren stripping solution, and the stripped raffinate solution.

16. The method of claim 1, wherein the retentate comprises at least about 95% of the contaminant in the at least one of the rich stripping solutions, the pregnant leach solution, the barren stripping solution, and the stripped raffinate solution.

17. The method of claim 1, wherein the filtering step is performed on the barren stripping solution and the contaminant constitutes unrecovered metal ions remaining in the barren stripping solution.

18. The method of claim 17, wherein the retentate comprises at least about 105% of the contaminate level in the barren stripping solution.

19. The method of claim 17, wherein the permeate has at least about 5% less contaminate concentration than the barren stripping solution.

20. The method of claim 1, wherein the retentate comprises at least most of the contaminate in the at least a portion of at least one of the rich stripping solution, the pregnant leach solution, a barren stripping solution derived from the rich stripping solution, and the stripped raffinate solution.

21. The method of claim 1, wherein the permeate comprises at least most of the at least a portion of at least one of the rich stripping solution, the pregnant leach solution, a barren stripping solution derived from the rich stripping solution, and the stripped raffinate solution.

22. A method for recovering a metal from a metal-containing material, comprising:

(a) contacting a lixiviant with a valuable metal-containing material to form a pregnant leach solution that includes at least most of the valuable metal in the metal-containing material and a contaminate metal, wherein the valuable metal is at least one of copper, gold, silver, cobalt, uranium, and mixtures thereof and the contaminate metal is at least one of zinc, cadmium, iron, manganese, aluminum, calcium, magnesium, arsenic, selenium, nickel, and mixtures thereof;

(b) converting the pregnant leach solution into a metal-rich solution containing at least most of the valuable metal in the pregnant leach solution and the contaminate metal;

(c) filtering the metal-rich solution or a solution derived therefrom to remove at least a portion of the contaminate metal and form a retentate including at least most of the contaminate metal; and (d) recovering the metal from the metal-rich solution by electrowinning.

23. The method of claim 22, wherein the converting step (b) comprises contacting the pregnant leach solution with a collector and thereafter contacting the collector with a stripping solution to form the metal-rich solution.

24. A method for recovering metal from a metal-containing material, comprising:

(a) contacting a leach solution containing a leaching agent with the metal-containing material to form a pregnant leach solution containing at least a portion of the metal dissolved therein and a contaminant, wherein the contaminant is at least one of a suspended solid and a colloidal solid;

(b) filtering at least a portion of the pregnant leach solution with a filter having a pore size small enough to reject the contaminant and large enough to pass the dissolved metal and leaching agent to form a permeate containing at least most of the metal and leaching agent in the pregnant leach solution and a retentate containing at least most of the contaminate in the pregnant leach solution; and (c) recovering the metal from the permeate.

25. The method of claim 24, wherein the metal is selected from the group consisting of copper, nickel, zinc, uranium and mixtures thereof.

26. The method of claim 24, wherein the filter has a pore size ranging from about 0.003 to about 0.1 microns.

27. The method of claim 24, wherein the retentate comprises no more than about 20% by volume of the pregnant leach solution.

28. The method of claim 24, wherein the permeate comprises at least about 80% by volume of the pregnant leach solution.

29. The method of claim 24, wherein the permeate comprises no more than about 10% of the contaminates contained in the pregnant leach solution.

30. The method of claim 24, wherein the retentate comprises at least about 90% of the contaminates in the pregnant leach solution.

31. The method of claim 24, wherein the permeate comprises at least about 80% of the metal in the pregnant leach solution.

32. The method of claim 24, wherein the filter is at least one of an ultrafilter and a microfilter.

33. The method of claim 24, wherein the retentate includes a portion of the metal in the pregnant leach solution.

* * * * *